Jan. 9, 1934. J. J. FERLIN ET AL 1,942,417
VALVE
Filed April 17 1929

INVENTOR.
John J. Ferlin,
Herbert W. Goetz,
BY
ATTORNEY.

Patented Jan. 9, 1934

1,942,417

UNITED STATES PATENT OFFICE 1,942,417

VALVE

John J. Ferlin, Los Angeles, and Herbert W. Goetz, Alhambra, Calif.

Application April 17, 1929. Serial No. 355,783

8 Claims. (Cl. 251—129)

This invention is a valve of the poppet type particularly adapted for use in a pump such as a slush pump; and it is the object of the invention to provide for shifting of the valve with relation to its seat so as to present constantly changing contacting surfaces adapted to maintain a tight seating engagement with uniform distribution of wear. For this purpose the valve and its seat have correspondingly curved contacting surfaces, with the valve adapted for shifting circumferentially of the cooperating contacting surfaces so as to constantly present a new area of engagement between said surfaces.

More particularly it is an object of the invention to provide the valve and its seat with correspondingly curved contacting surfaces comprising a zone of a sphere, with the valve adapted for rotation on an axis extending in the direction of opening and closing movement of the valve so as to relatively circumferentially shift the cooperating curved contacting surfaces.

It is a still further object of the invention to adapt the valve for oscillation in a plane extending in the direction of its opening and closing movement so as to relatively circumferentially shift the cooperating curved contacting surfaces.

Further objects of the invention will be readily understood from the following description of the accompanying drawing, in which.

Figure 1:
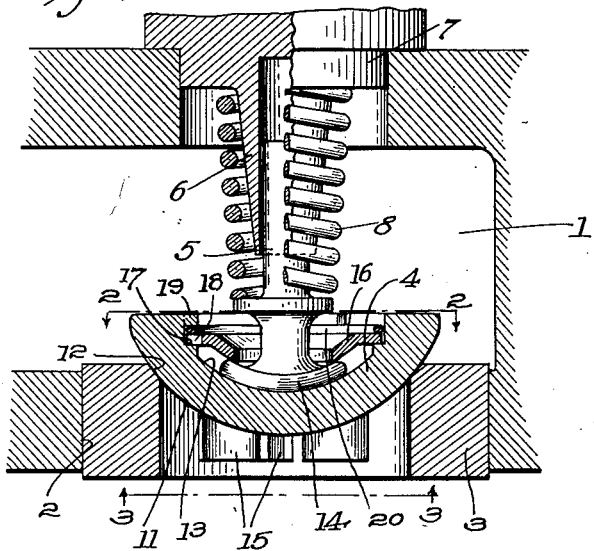
Fig. 1 is an axial section through the valve showing it in closed position.

The valve is illustrated as employed in a usual slush pump having the valve chest 1 provided with opening 2 for the annular valve seat 3, and the valve 4 which cooperates with seat 3 is provided with a valve stem 5 which is guided in a usual bearing 6 depending from a cover plate 7, with a coil spring 8 surrounding the valve stem and yieldably closing the valve against its seat.

The valve and its seat present correspondingly curved cooperating contacting surfaces adapting the valve for shifting with relation to its seat so as to uniformly distribute the wear and maintain a tight seating engagement. This shifting of the valve may comprise rotation thereof in a plane extending transversely to the direction of opening and closing movement of the valve; and the valve may also be adapted for oscillation in a plane extending in the direction of its opening and closing movement.

Figure 4:
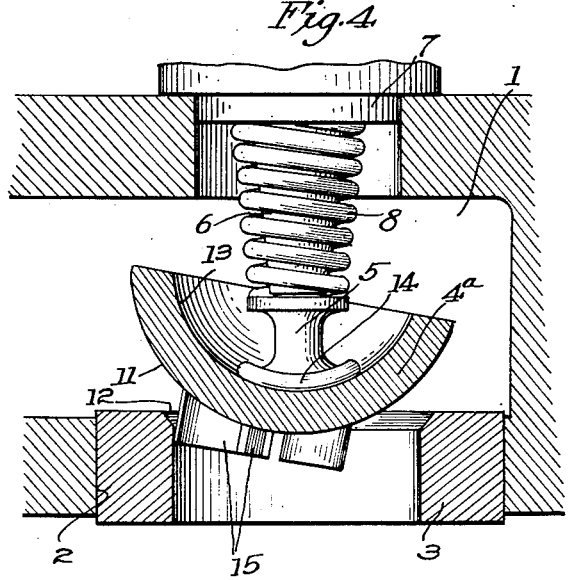
Fig. 4 is an axial section through a modification of the valvular structure, showing the valve in open position.
Figure 3:
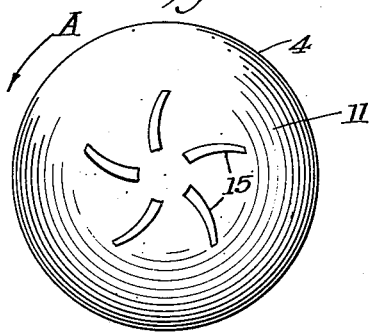
Fig. 3 is a bottom plan view of the valve as indicated by the line 3—3 of Fig. 1.

As an instance of this arrangement the valve 4 is preferably a minor segment of a hollow sphere, with its outer curved surface 11 adapted to seat on a concentric annular curved surface 12 of the seat 3, and its inner curved surface 13 adapted for sliding abutment by a mushroom head 14 on the valve stem 5. The valve is thus free to rotate in planes extending transversely to the direction of opening and closing movement of the valve as indicated by the arrow A in Fig. 3, and is also adapted for oscillation in planes extending in the direction of opening and closing movement of the valve as shown in Fig. 4. The cooperating curved surfaces 11—12 are thus adapted to maintain a snug contact irrespective of turning movement of the valve, and thus provide for tightly seating the valve while uniformly distributing the wear over the surface 11.

Means are preferably provided for positively rotating the valve with relation to its seat, and for this purpose impeller blades 15 may depend from the valve so that flow of fluid through the open valve will impinge against the blades for rotating the valve. The blades 15 are preferably also adapted to limit oscillation of the valve and maintain its alinement with its seat, and for this purpose the blades are so positioned that even with maximum opening of the valve as limited by the compression of spring 8 and the abutment of stem 5 against its bearing guide 6, the blades 15 will impinge against the bore of seat 3 as shown in Fig. 4, so as to limit oscillation of the valve against movement beyond the point where it will still aline with the entire circumference defined by the seating surface 12.

Figure 2:
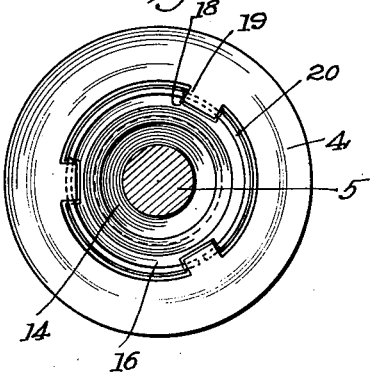
Fig. 2 is a transverse section on the line 2—2 of Fig. 1.

Optional or additional means as shown in Figs. 1 and 2 may be provided for limiting oscillation of the valve and maintaining sliding contact of the mushroom head 14 of the valve stem against the valve, the said means being shown as an annulus 16 adapted to be fixed in the hollow segment of a sphere which constitutes the valve, with the inner periphery of said annulus overlying and engaging the mushroom head 14 of the valve stem, and the outer periphery of the annulus seating upon an annular shoulder 17 formed in the hollow interior of the spherical segmental valve. The mushroom head 14 is thus held against axial disengagement from the valve by the overlying fixed annulus 16, which also limits oscillation of the valve by abutment of valve stem 5 against the inner peripheral wall of the annulus.

The annulus 16 may be seated on shoulder 17 and releasably held in place by notching the outer periphery of the annulus as shown at 18, so that the annulus may be slipped over corresponding radially inwardly projecting lugs 19 at the periphery of the valve, with a split resilient annulus 20 of wire or the like adapted to engage beneath lugs 19 and seat on the annulus 16 as shown in Figs. 1 and 2 for releasably securing the parts in assembled relation.

We have thus provided a construction whereby the valve is free for universal shifting with relation to its seat so as to distribute wear while maintaining a tight seating engagement; and the valve may be provided with means for positively shifting the same responsive to pressure of the flow through the open valve, and said means for positively shifting the valve may also limit movement thereof so as to maintain alinement of the valve with its seat, with said movement limiting means employed either in lieu or in conjunction with a retaining means which is adapted to maintain sliding contact between the valve and its stem and also limit the relative sliding movement between said parts.

The invention thus provides an extremely simple but practical valve adapted for fluid tight seating engagement without excessive wear.

If desired the invention may be embodied in the modified construction illustrated at Fig. 4, wherein the valve 4ª cooperates with the valve seat 3 as previously described but the annulus 16 and its retaining means are dispensed with, the valve being held in operative alinement with its seat when the valve is opened, simply through abutment of blades 15 against the wall of the bore of seat 3 as has been described.

We claim:

1. In combination, a poppet valve and a cooperating valve seat having contacting surfaces comprising a zone of a sphere whereby the valve is adapted for universal revolution relative to its cooperating seat while maintaining relative positioning of said contacting surfaces insuring their snug seating engagement, a mounting for the valve adapting it for said universal revolution, means for limiting opening movement of the valve, and blades on the valve adapted for impingement by flow of fluid through the open valve for rotating the valve in a plane transverse to the direction of opening and closing movement of the valve, the said blades being so positioned as to insure abutment thereof against the valve seat even when the valve is at its limit of opening movement, with said abutment limiting revolution of the valve in planes extending in the direction of opening and closing movement of the valve.

2. In combination, an annular valve seat, a valve comprising a segment of a hollow sphere, the outer surface of said segmental spherical valve and said annular valve seat comprising cooperating contacting surfaces, a mounting for the valve adapting it for universal revolution, blades projecting from the outer surface of the segmental spherical valve adapted for impingement by flow of fluid through the open valve for rotating the valve relative to the annular valve seat, and means for limiting opening movement of the valve, the said blades being so positioned as to insure abutment thereof against the valve seat even when the valve is at its limit of opening movement, with said abutment limiting revolution of the valve in planes extending in the direction of opening and closing movement of the valve.

3. In combination, a poppet valve and a cooperating valve seat having contacting surfaces comprising a zone of a sphere whereby the valve is adapted for universal revolution relative to its cooperating seat while maintaining relative positioning of said contacting surfaces insuring their snug seating engagement, a valve stem adapted for sliding abutment against the valve so that the valve is free for said universal revolution relative to its stem, means for limiting opening movement of the valve, and blades on the valve adapted for impingement by flow of fluid through the open valve for rotating the valve in a plane transverse to the direction of opening and closing movement of the valve, the said blades being so positioned as to insure abutment thereof against the valve seat even when the valve is at its limit of opening movement, with said abutment limiting revolution of the valve in planes extending in the direction of opening and closing movement of the valve.

4. In combination, a poppet valve and a cooperating valve seat having contacting surfaces comprising a zone of a sphere whereby the valve is adapted for universal revolution relative to its cooperating seat while maintaining relative positioning of said contacting surfaces insuring their snug seating engagement, a valve stem adapted for sliding abutment against the valve so that the valve is free for said universal revolution relative to its stem, means for securing the valve and its stem against relative movement axially of the stem, means for limiting opening movement of the valve, and blades on the valve adapted for impingement by flow of fluid through the open valve for rotating the valve in a plane transverse to the direction of opening and closing movement of the valve, the said blades being so positioned as to insure abutment thereof against the valve seat even when the valve is at its limit of opening movement, with said abutment limiting revolution of the valve in planes extending in the direction of opening and closing movement of the valve.

5. In combination, an annular valve seat, a valve comprising a segment of a hollow sphere, the outer surface of said segmental spherical valve and said annular valve seat comprising cooperating contacting surfaces, a valve stem having a mushroom head adapted for sliding abutment against the inner surface of the segment of the hollow sphere so as to permit revolution of the valve relative to its stem, and an abutment in the hollow sphere slidably overlying the head of the valve stem for securing the valve and head against relative movement axially of the valve stem.

6. In combination, an annular valve seat, a valve comprising a segment of a hollow sphere, the outer surface of said segmental spherical valve and said annular valve seat comprising cooperating contacting surfaces, a valve stem having a mushroom head adapted for sliding abutment against the inner surface of the segment of the hollow sphere so as to permit revolution of the valve relative to its stem, and an annular abutment detachably fixed in the hollow sphere and slidably overlying the head of the valve stem for securing the valve and head against relative movement axially of the valve stem.

7. In combination, an annular valve seat, a valve comprising a segment of a hollow sphere, the outer surface of said segmental spherical valve and said annular valve seat comprising cooperating contacting surfaces, a valve stem having a mushroom head adapted for sliding abutment against the inner surface of the segment of the hollow sphere so as to permit revolution of the valve relative to its stem, and an annular abutment detachably fixed in the hollow sphere so as to surround the valve stem with the bore of the annular abutment radially spaced from the valve stem and said annular abutment slidably overlying the head of the valve stem for securing the valve and head against relative movement axially of the valve stem.

8. In combination, an annular valve seat, a valve comprising a segment of a hollow sphere, the outer surface of said segmental spherical valve and said annular valve seat comprising cooperating contacting surfaces, a valve stem, a head on the valve stem having upper and lower spherically curved surfaces, the spherically curved lower surface of the head being adapted for sliding abutment against the inner surface of the segment of the hollow sphere, and retaining means on the valve having a spherically curved surface overlying and adapted for sliding abutment against the spherically curved upper surface of the head, the retaining means securing the valve and stem against relative movement longitudinally of the stem and maintaining the sliding abutment of the lower curved surface of the head against the inner surface of the valve, while the sliding abutments at the upper and lower curved surfaces of the head cooperate to permit revolution of the valve relative to the stem.

JOHN J. FERLIN.
HERBERT W. GOETZ.